United States Patent [19]

Karl

[11] 3,869,579

[45] Mar. 4, 1975

[54] APPARATUS FOR MUTUALLY SYNCHRONIZING OSCILLATORS IN SWITCHING CENTERS OF A TELECOMMUNICATION NETWORK

[76] Inventor: Otto Karl, Forstenrieder allee 78/III, 8000 Munchen 71, Germany

[22] Filed: Oct. 3, 1972

[21] Appl. No.: 294,513

[30] Foreign Application Priority Data

Oct. 6, 1971 Germany............................ 2149911

[52] U.S. Cl............................................... 179/15 BS

[51] Int. Cl............................................... H04j 3/06

[58] Field of Search............. 179/15 BS; 178/69.5 R

[56] References Cited

UNITED STATES PATENTS

| | | | |
|---|---|---|---|
| 3,483,330 | 12/1969 | Inose | 179/15 BS |
| 3,555,194 | 1/1971 | Goto | 179/15 BS |
| 3,578,956 | 5/1971 | McCall | 178/69.5 R |
| 3,597,552 | 8/1971 | Goto | 179/15 BS |

*Primary Examiner*—David L. Stewart

[57] ABSTRACT

Apparatus for mutually synchronizing central office clock oscillators provided in each of a plurality of interconnected switching centers of a telecommunication network is described. In each switching center the local clock oscillator output is coupled to a central office frequency divider, while the clock signals from other switching centers are coupled to line frequency dividers. After the occurrence of each reference phase formation, the line frequency dividers operate 180° out of phase with the central office frequency divider. Phase comparators are coupled to the outputs of each line frequency divider, as well as the output of the central office frequency divider for producing output signals indicative of the phase difference between the line frequencies and the local clock frequency. The outputs of the phase comparators are resistively added producing a mean signal, which regulate the local clock oscillator. The control range of the clock oscillator corresponds to the measured phase difference conditioned by the greatest possible no-load frequency difference between the compared switching centers' clock outputs. A reference phase formation occurs upon the crossing of this control range. A second synchronizing circuit is additionally provided and is constructed in the same manner as the above synchronizing circuit. This circuit has a control range corresponding to the phase difference resulting from the sum of the phase difference between switching centers and the greatest transit time on the multiplex lines connecting the compared switching centers. An additional control signal is supplied by this second synchronizing circuit for aiding in the regulation of the local clock oscillator.

6 Claims, 2 Drawing Figures

APPARATUS FOR MUTUALLY SYNCHRONIZING OSCILLATORS IN SWITCHING CENTERS OF A TELECOMMUNICATION NETWORK

BACKGROUND OF THE INVENTION

In conventional telecommunication switching centers, more particularly, telephone switching centers, transmissions takes place of analog signals, continuous in time, to physically separated transmission channels. The latest types of telephone switching centers do not utilize the latter space-division principle, but rather the time-division principle, wherein analog signals which are discontinuous in time are transmitted.

Another significant trend in recent years has been the design of telecommunication switching centers wherein digital signals that are discontinuous in time are transmitted. in this connection, pulse code modulation (PCM) plays an important role, wherein at periodically consecutive points of time the instantaneous amplitude values of the voice or other message signal are represented by binary values, which are then transmitted. The primary object of a PCM time-division switching center, then, is to switch binary words that occur on the PCM receiving time-division lines leading to the switching center in particular time channels assigned to the individual messages towards PCM time-division lines selected according to the desired connection and leading away from the switching center. In a four-wire system the switching always takes place on a four-wire basis, i.e., the two directions of transmission during the switching are to be considered as separate. Usually, the same time channel within the pulse frame concerned, based on the pulse frame of the switching center in question at the transmitting end, is utilized at any given time for the transmission in both directions of transmission of the binary words to be transferred in the course of a communication over a given PCM time-division line operated on a four-wire basis and connected with such a switching center (see, e.g., proceedings of IEEE, 111 (1964) 12, pp. 1976–1980).

A prerequisite for proper switching in a PCM time-division switching center is that the binary words to be switched be timely available for their switching. This prerequisite is not met at the outset, since the individual time-division lines leading to a PCM time-division switching center of a PCM telecommunication network usually have different propagation times, which are subject to temperature-dependent fluctuations. Further, it is likely that the bit timing pulses of the individual PCM time-division switching centers do not readily correspond to one another.

To meet the above described prevequisite, three problems must be solved: (1) small phase variations ("jitters") appearing on the transmission path must be eliminated; (2) the difference in bit rates between signals transmitted on various PCM time-division lines, i.e., from various directions, must be compensated; (3) a pulse frame compensation must be effected, so that all time channels of the same ordinal number within the pulse frame concerned in incoming and outgoing direction coincide in time, and the switching of the connection for both directions of transmission may thus be performed concurrently at any given time (isochronous operation).

The first problem may be solved with a circuit, in which the transmitted bits trigger a high quality oscillating circuit, which determines the clock pulse rate of the bits, thus regenerated (see Proceedings of IEEE (1966) 9, 1420–1428, 1422; Informationen Fernsprech-Vermittlungstechnik 5(1969) 1, 48–59, 51).

The third problem may be solved by inserting delay lines having appropriate delay values into the individual PCM receiving lines leading to the individual PCM multiplex switching centers. The delay lines should have values such that the time on the PCM line concerned is a whole multiple of the duration of the information bit frame. By this means, the pulse frames of all PCM receiving lines leading to the switching centers concerned coincide in time among one another, and the pulse frames of all transmitting lines leading away from this switching center coincide, as given through a central office frame of the PCM switching center in question (see, e.g., Bell System Technical Journal Vol. XXXVIII (1959) 4, 909–932, 922; Proceedings of the IEEE, 111 (1964) 12, 1976–1980, Proceedings of the IEEE, 113 (1966) 9, 1420–1428; Informationen Fernsprech-Vermittlungstechnik 5 (1969) 1, 48–59, 52, 53). In conjunction with the aforementioned frame compensation, compensation of temperature-dependent running time oscillations may concurrently be carried out (see, e.g., Proceedings of the IEEE, 113 (1966) 9, 1420–1428; Informationen Fernsprech-Vermittlungstechnik 5 (1969 ) 1, 48–59, 53).

Various solutions have been proposed for compensating differences in bit rates (see, e.g., Proceedings of IEEE, 113, (1966) 9, 1420–1428, 1421; Informationen Fernsprech-Vermittlungstechnik 5 (1969) 1, 48–59, 51). These are as follows.

In the asynchronous method, each PCM multiplex switching center has its own independent clock generator, and each receiving line opens into a storage register, the storage capacity of which corresponds to the number of bits per pulse frame, and in which the binary words received are retained until they fit into the pulse frame of the PCM switching center concerned. The storage register causes, at the same time, the frame compensation discussed above.

In the quasi-synchronous method (also called dummy bit method), the switching centers of a PCM telecommunication network also have their own independent clock generators, but the information bit rate, i.e., the average number of information-carrying bits per second for all switching centers of the entire network is made equal. This is accomplished by compensating the differences between the clock frequencies of the bits of the individual switching centers and the uniform bit rate, through insertion of bits without information, known as dummy bits.

In the servo-synchronous method (master-slave method), a central clock generator determines the bit rate of the individual PCM time-division switching systems of a PCM telecommunication network.

Finally, in the autosynchronous method, the individual switching centers are provided with individual switching clock generators which, however, are not independent of one another. The various clock generators synchronize one another according to what is known as the phase averaging principle. It is known in the art (see, e.g., NTZ (1970) 5, 257–261) in accordance with the aforementioned principle to produce the line clock pulses of the individual incoming lines, whose phase shifts relative to the central office clock concerned are to bring about the regulation of the clock oscillator supplying the aforementioned central office pulse.

Such a phase shift may be caused by different clock frequencies of the clock oscillators provided in the individual switching centers and/or by changes of the propagation times of the lines. Since in practice such a phase shift can be greater than $2\pi$, a phase comparison with a view to determining the phase shift in question cannot be effected until the frequencies of the clocks being compared have been diminished by frequency dividers. The actual phase comparison between a line clock and the central office clock is effected by means of a bistable switching stage. The d.c. mean value of the output signal of this switching stage is proportional to the phase difference and, thus, proportional to the integral of a frequency difference; namely, the difference between the line clock frequency and the central office clock frequency.

The output signals of all switching stages are added using a resistive adder for the formation of the mean value and smoothed by an RC network. The capacitor voltage can then adjust the clock frequency of the central office clock oscillator by means of a varactor diode. The edge of the central office clock frequency divider acts on the counter inputs of the individual switching stages, and if a line clock fails, the associated switching stage runs as a counter with a pulse/pause ratio of 1:1, which leads to a regulating voltage which corresponds to an agreement between the line clock frequency and the central office clock frequency. The oscillator frequency which is set when all switching stages have a pulse/pause ratio of 1:1 is termed oscillator no-load frequency or clock frequency of the unregulated clock oscillator.

If a switching center is put into operation, a reference phase formation is effected, i.e., for the formation of a reference phase the beginning of the frequency dividing operations in the line clock frequency dividers is displaced by about 180° with respect to the beginning of a frequency division process in the central office frequency divider. By this means, the regulating voltage reaches the middle of the control range (see, e.g., NTZ (1968) 9, 533–539), so that the oscillator frequency may be regulated toward the higher as well as toward the lower frequencies.

In operation, it may be necessary to carry out one more reference phase formation for one of the line clock frequency dividers. Such a reference phase formation may be brought about by a monitoring circuit or by manual operation. The control range fixed by this monitoring circuit is selected such that the phase differences, caused by the given frequency tolerances of the clock oscillators disposed in the switching centers of the telecommunication network, as well as by the phase differences caused by the running time oscillations to be expected on the multiplex lines of the telecommunication network interconnecting the network junctions, are recorded between the line clock and the central office clock in the current regulating process. These do not initiate a reference phase formation, due to an excessive deviation of the displacement of 180° of the line clock frequency division process with respect to the central office clock frequency division process.

For the static network condition, two magnitudes are of interest: the deviation of the final frequency of the clock common to all switching centers from a predetermined nominal frequency and the phase differences (phase distortions) appearing at any given time between the line clock and the central office clock. Both of these values depend on the frequency tolerances of the unregulated clock oscillators, i.e., on the frequency deviations at any given moment between the no-load frequency and the nominal frequency, and on the variations of the propagation times of the lines. The influence of these two reference variables on the system is determined with control kurtosis or peakedness of flatness of a controlled characteristic given by the quotient of the clock frequency variation and the phase difference. The final frequency of the clock or the deviation thereof from the nominal frequency is determined by two components, namely by a first component, which independently of the control kurtosis, depends solely on the frequency deviations of the unregulated oscillators of the nominal frequency. The second component is proportional to the control kurtosis and to the running time variations. The phase distortion is, likewise, determined by two components; namely, by a first component which is proportional to the frequency deviations of the unregulated oscillators from the nominal frequency and inversely proportional to the control kurtosis, and by a second component which is determined independently of the control kurtosis, solely by the transmission time variations.

In a mutual synchronization of the switching centers of a time-division telecommunication network, according to the phase averaging principle, one distinguishes between two special synchronizing methods: the single-ended method and the double-ended method. If the synchronization takes place according to the single-ended method, as explained hereinabove, the sum or the mean value of the individual phase differences existing at any given time between the line clock and the central office clock is utilized as a manipulated variable for the central office oscillator concerned. If the synchronization is performed according to the double-ended method, in addition thereto also the phase comparison result appearing on the corresponding phase comparator of the adjacent network junction in question is utilized, concurrently, at any given time, for the regulation. This is accomplished by subtracting the phase comparison result, prior to the mean value formation, from the corresponding phase comparison result of the network junction currently being considered (see, e.g., NTZ (1970) 8, 402–411, 408).

If the synchronization takes place according to the double-ended method, influences of propagation time variations of the lines are compensated on the clock frequency (in contradistinction to a synchronization according to the single-ended method). However, the double-ended method, in comparison with the single-ended method, requires an additional transmission of control data between the individual switching centers of the PCM telecommunication network.

In a synchronization according to the single-ended method, which does not require such additional expenditures for transmission, the influence of transmission time oscillations of the lines on the clock frequency, if the PCM telecommunication network is fully interconnected, can be completely controlled. However, the less intermeshed such a network is, the more difficult it is to take transmission time oscillations into account through meaningful selection of the control kurtosis. In the case of a correspondingly small control kurtosis the influence of transmission time variations on the clock frequency could, it is true, be kept small, but great phase differences (distortions) are connected with the control of frequency oscillations. Such great phase differences are to be reckoned with, particularly in networks having the form of a chain and if, for reasons of compatibility with asynchronous PCM telecommunications networks, a high stability of frequency is to be preserved. However, these great phase differences between the line clock and the central office clock require, particularly if systems having a multiplex clock frequency are synchronized, corresponding buffer capacities in the individual switching centers of the PCM telecommunication network to avoid information losses. This, in practice, is even felt as undesirable, if this in itself could be disregarded in the presence of storage registers each receiving a full pulse frame at the end of the individual incoming PCM time division lines.

An object of the invention is to provide a means for eliminating influences of propagation time variations on the clock frequency, even if the synchronization takes place according to the aforementioned single-ended method.

SUMMARY OF THE INVENTION

The invention relates to apparatus for mutually synchronizing central office clock oscillators provided in the switching center of a telecommunication network, particularly a PCM time-division telecommunication network. Such networks have a plurality of interconnected switching centers, wherein there are provided in each switching center a central office clock frequency divider coupled to the central office clock, as well as line clock frequency dividers coupled to the line clocks disposed on the time-division lines entering the switching center. Thereby, the line clock frequency dividers, after each reference phase formation that may occur, operate with a temporary displacement of about 180° relative to the central office clock frequency divider, and thereby the output signals of the individual line clock frequency dividers are each coupled to phase discriminators on each line, together with the output signal of the central office clock frequency divider. The output signals of the phase discriminators, on each line, combined by an element producing a cumulative value or a mean value, form the control signal for the frequency regulation of the central office clock oscillator within its frequency control range.

The inventive circuit arrangement provides, in addition to a first synchronizing circuit comprising central office clock and line clock frequency dividers, phase discriminators and an element producing a cumulative or a mean value and having a control range corresponding to the phase difference conditioned by the greatest possible no-load frequency difference of the clock oscillators of two network junctions. A reference phase formation is triggered upon the crossing of the control range. There is provided a corresponding second synchronizing circuit having central office clock and line clock frequency dividers and phase discriminators and having an operating range corresponding to the phase difference resulting from the sum of the aforementioned phase difference and the maximum propagation time variation of a multiplex line connecting two switching centers, which supplies an additional signal to the control signal supplied by the first synchronizing circuit. This additional signal, if there is a positive difference between the central office clock phase position and the line clock phase position nearest the mean, or if there is a positive difference, which exceeds a predetermined limit value, between the central office clock phase position and the phase position of at least one line clock defines at least one frequency control range lying below the no-load frequency of the oscillator and if there is a negative difference between the central clock phase position and the line clock phase position, nearest the mean, or if there is a negative difference, which falls below a predetermined limit value, between the central office clock phase position and the phase position of at least one line clock, defines at least one frequency control range lying above the no-load frequency of the oscillators. The frequency of the central office clock oscillators is regulated in the frequency control range by the control signal supplied by the first synchronizing circuit.

The invention is based on the principle of introducing step-by-step phase shifts of suitable direction in cooperative relationship of purposefully induced reference phase formations and defined frequency control range jumps in a network junction, with which greater phase differences between the central office clock and the line clock can be eliminated by degrees or avoided altogether. The invention offers the advantage that the influences of propagation time variations on the clock output frequency can be eliminated without the necessity of diminishing the control kurtosis. Instead, the control kurtosis may be quite large, as desired for limiting phase differences which are based on deviations of the no-load frequencies of the oscillators from the nominal frequency, without thereby causing phase shifts which are dependent on propagation time variations to have an influence on the output frequency of the clock. It is to be noted that this influence can in itself also be eliminated by a purposeful formation of the reference phase alone, so that such a reference phase formation is likewise of importance.

In connection with the introduction of defined frequency control range change, this result may in any case be achieved in conjunction with the additional advantage of a buffer need reduced by the factor 1/5 to 1/10 corresponding to the phase differences limited thereby to avoid information losses. However, these defined frequency control range shifts have an importance of their own in that, by themselves, they enable a limited elimination of phases differences without additional reference formation. This, at first limited, elimination of phase differences may be continued gradually in conjunction with a reference phase formation which is carried out several times, should this be desired.

The frequency control range change may be proportional to the respective phase differences and be coupled with the advantage of correspondingly great accuracy and a comparatively quiet network. It is simpler, however, to set one frequency control range above and one below the no-load frequency of the oscillator by means of an additional binary signal. Basically, the formation of the reference phase and the variation of the additional signal can proceed independently of one another with respect to time. However, in order to give full effect to the advantages of the invention, it is useful to vary the additional signal solely in conjunction with the formation of a reference phase. The reference phase formation need thereby not be triggered by a crossing of the control range of the first synchronizing circuit, but may instead, or also, be initiated externally at regular or irregular time intervals, e.g., also upon crossing the operating range of the second synchronizing circuit. This may make it easier to avoid phase differences from the outset, should this be desired.

For a detailed description of the invention, reference is made to the detailed description of a preferred embodiment, given below, and the accompanying drawings, wherein:

FIG. 1 illustrates, by schematic diagram, a circuit arrangement in accordance with the invention and FIG. 2 is a graph illustrating the position of the frequency control ranges of the FIG. 1 embodiment and in accordance with the invention.

DETAILED DESCRIPTION OF THE DRAWINGS

Figure 1:
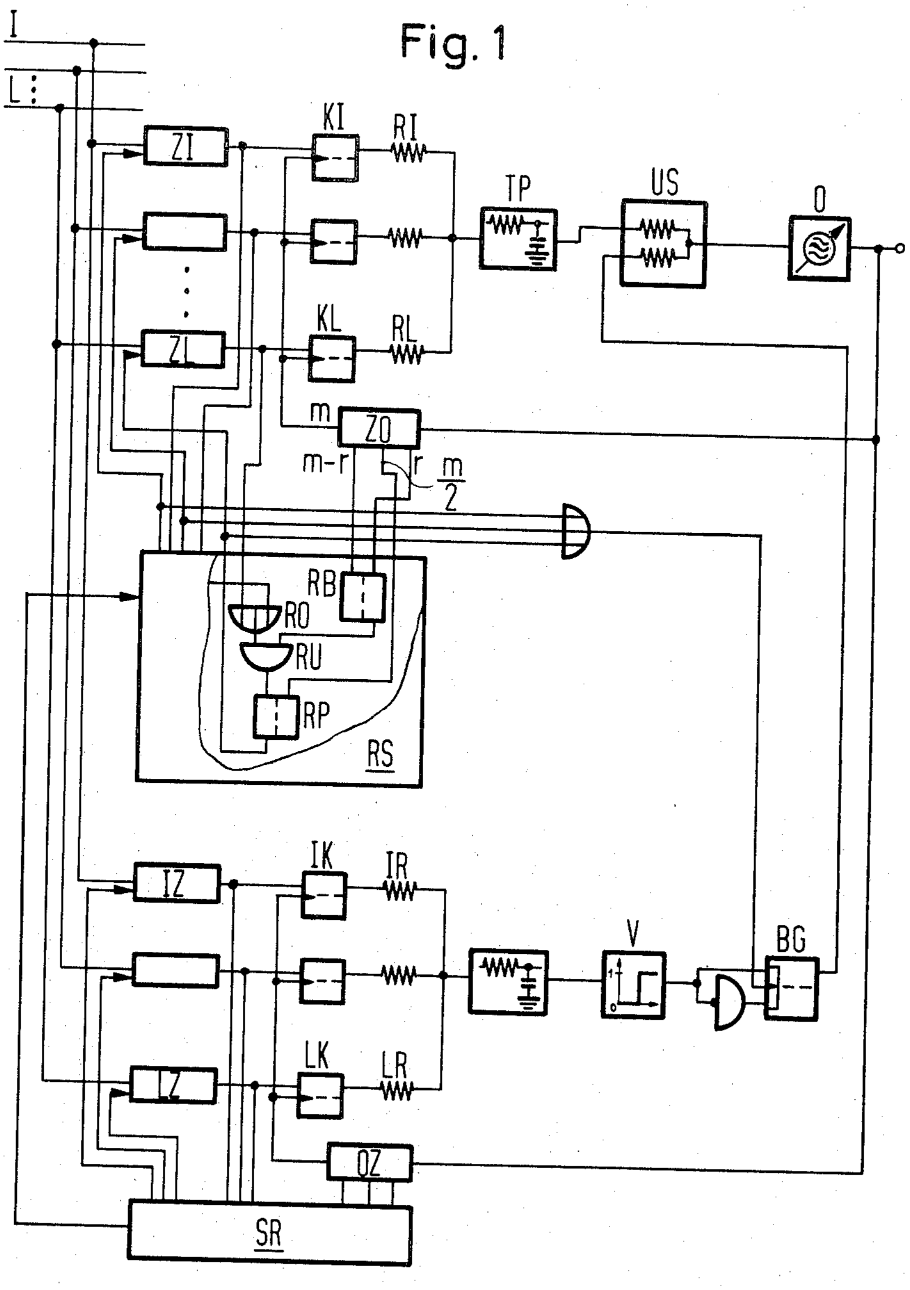
Figure 2:
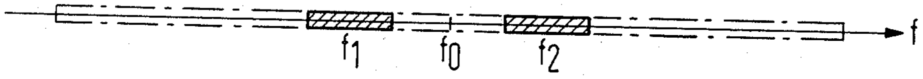

FIG. 1 shows in its upper portion a diagrammatic view of a known synchronizing circuit operating according to the phase averaging principle, as disclosed in the structure illustrated in FIG. 2 of German Auslegeschrift No. 1,591,593, as well as from "Nachrichtentechnische Zeitschrift," 1968, page 534, FIG. 3, and the issue of the same publication, 1970, page 257, FIG. 1.

This circuit arrangement provided, for example, in a switching center of a PCM time-division telecommunication network, comprising a number of switching centers, has an oscillator 0 to be synchronized according to the phase averaging principle by the oscillators of the aforementioned additional switching centers via the time-division lines I . . . L coming from the other switching centers. The line clock pulses coming from the oscillators provided in the aforesaid other correspondingly constructed switching centers are routed to the synchronizing circuit over the incoming multiplex lines I . . . L. These line clock pulses travel from the multiplex lines I . . . L to the line clock frequency dividers ZI . . . ZL followed by phase discriminators for each line in the form of bistable switching circuits KI . . . KL, e.g., flip-flops, whose reset inputs are connected to output m of a central office clock frequency divider ZO, which may simply be a binary counter. The d.c. mean value of the output signal of each bistable stage is proportional to the phase difference between the line clock concerned and the central office clock.

The output signals of the bistable stages KI . . . KL are combined by a resistive summing network constructed with resistances RI . . . RL. A low-pass filter TP is connected to the common terminal of the resistors. The output signal of the low-pass filter TP forms the control signal to be routed to the control input of the central office clock oscillator 0, the frequency of which is to be regulated.

The line clock frequency dividers ZI . . . ZL, operate in the known manner, displaced temporarily by about 180° with respect to the central office clock frequency divider ZO, after a reference phase formation that may occur.

The synchronizing circuit has a corresponding control device RS in order to control and monitor the reference phase formation. In FIG. 1 it is indicated that the control device RS includes a bistable switching stage RB, e.g., flip-flop, which is connected with its two inputs to two outputs $m - r$ and $r$ of the central office clock frequency divider ZO, which outputs correspond to the control range of the synchronizing circuit.

In this illustration, the central office clock frequency divider ZO is constructed as a counter having a counting volume $m$, and which is provided with counter outputs $r$, $m/2$ and $m - r$, in addition to the output $m$ which is activated every time after the mth counting step has been reached. The counter outputs $r$, $m/2$ and $m - r$ are activated in the course of a counting operation during the $r$th or the $(m/2)$th or the $(m - r)$th counting step. The distance of the $(m - r)$th or the rth counting step from the $(m/2)$th counting step corresponds to the phase difference caused by the highest occurring no-load frequency difference of the clock oscillators (0) of two time division switching centers of the time-division telecommunication network. That is, the phase control range $p_g$ of the first synchronizing circuit satisfies the condition:

$$p_g = (m - r - r) \cdot 2\pi \geqq \left| w_\mu - w_\gamma \right| \max/o ,$$

where $(w_\mu - w_\gamma)_{max}$ stands for the highest occurring no-load frequency difference between the oscillators of two switching centers and $o$ the control kurtosis.

Upon crossing the control range defined by the rth and the $(m - r)$th counting step, a reference phase formation occurs in the upper part of the synchronizing circuit illustrated in FIG. 1. The bistable stage RB is activated at the output, outside the limits of the synchronizing range, so that an AND gate RU connected to its output is prepared for the occurrence of coincidence. To the other input of this AND gate RU is connected the output of the line clock frequency divider ZL, which may, likewise, be constructed as a counter having a corresponding counting volume. If the line clock frequency divider ZL reaches the last counting step in the course of a frequency division process before the central office clock frequency divider ZO reaches the rth counting step in the course of its currently running frequency dividing operation or after it has reached the $(m - r)$th counting step, the coincidence requirement for the AND element RU is met. An output from Ru leads to an activation of a following bistable switching stage RP. Activation of RP causes a reset signal to be delivered from its output to the reset input of the line clock frequency divider. Thus, the line clock frequency divider ZL is restored to its initial position, in which it will remain during the application of the reset signal. This lasts until the bistable stage RP is again reset, which takes place in the circuit arrangement shown in FIG. 1 by routing a reset signal from the counting output $m/2$ of the central office frequency divider ZO. The line clock frequency divider ZL now starts with a temporary displacement of 180° with respect to the central office clock frequency divider with a new frequency division process.

In FIG. 1, it is indicated that into the connection leading from the output of the line clock frequency divider ZL to the associated input of the AND element RU still another OR element RO may be inserted. If necessary, OR gate can trigger reference phase formations through signals fed from the outside. Similarly, the control unit RS which monitors the reference phase formation may also cooperate with the other line clock frequency reducers ZI . . . ZL (not shown in detail in FIG. 1).

In addition to the first synchronizing circuit, described above, there is provided a second synchronizing circuit having a central office clock frequency divider OZ, line clock frequency dividers IZ . . . LZ and phase discriminators IK . . . LK, whose operating range corresponds to the phase difference resulting from the sum of the phase differences which is significant for the control range of the first synchronizing circuit and the highest transit-time variation of a multiplex line connecting two network junctions. These components may be constructed in the same manner as the corresponding components described above.

The second synchronizing circuit may have a control unit (SR in FIG. 1) which is constructed like the first synchronizing circuit, but the phase control range is selected so that no reference phase formations take place in the second synchronizing circuit during its operation. To achieve this purpose, the phase control range $p_z$ of the second synchronizing circuit has to satisfy the condition:

$$p_z \geqq p_g + z_{\mu\gamma} \quad \max$$

where $z_{\mu\gamma}$ max stands for the maximum transit-time variations on a line connecting two switching centers $\mu$ and $\gamma$ and $p_g$ the aforementioned phase control range of the first synchronizing circuit, which, in turn, has to satisfy the condition:

$$p_g \geqq \left| w_\mu \quad - w_\gamma \quad \right| \max/o$$

where $w_\mu - w_\gamma$ max stands for the highest occurring no-load frequency difference between two network junctions $\mu$, $\gamma$ and 0 the control kurtosis.

In operation, the clock frequency dividers of the second synchronizing circuit run locked to the individual line clocks or with the central office clock. In order to ensure such an in-phase operation, other appropriate safety measures are provided, if necessary, e.g., by doubling the circuit and/or in the form of an equivalent circuit of clock frequency dividers. The output signals of the phase comparators IK . . . LK of the second synchronizing circuit produce, therefore, at any given time the temporary phase shift between the central office clock pulse frame and the pulse frame of the line clock in question.

The output signals of the phase comparators IK . . . LK of the second synchronizing circuit are again combined by an adder having resistances IR . . . LR. A low-pass filter, connected to the adder output, has its output connected to comparator V which compares its output signal with a preset nominal value. This comparator V may simply be formed by a known threshold element. Its output is connected directly to one conditioning input and, over an inverter, to the other conditioning input of a bistable switch stage forming a binary signal generator BG. The input of this bistable switching stage is connected, through an OR gate, to the control input RS monitoring the reference phase formation in the first synchronizing circuit.

The second synchronizing circuit supplies an additional binary signal to the control signal supplied by the first synchronizing circuit. This signal, if there is a positive difference between the central clock phase position and the line clock phase position nearest to mean, defines a frequency control range ($f_1$ in FIG. 2) lying below the no-load frequency ($f_0$ in FIG. 2) of the oscillator. If there is a negative difference between the central office clock phase position and the line clock phase position nearest the mean, a frequency control range ($f_2$ in FIG. 2) lying above the no-load ($f_0$ in FIG. 2) of the oscillator is defined. In this range, the frequency of the central office clock oscillator 0 is regulated by the control signal supplied by the first synchronizing circuit, whereby a variation of the additional signal is only effected in conjunction with a reference phase formation in the first synchronizing circuit.

To this end, there, for example, is provided between the element forming a cumulative or a mean value (RI . . . RL) of the first synchronizing circuit and the central office clock oscillator O, an adder in the form of a low frequency stage US having two resistances. One of these resistances receives the additional signal from the binary signal generator BG, which can only be switched if there is a reference phase formation. To this binary signal generator BG is routed, from the comparator V connected in series therewith, in the presence of an output signal of the element forming a cumulative value or a mean value (IR . . . LR) and exceeding a threshold corresponding to a pulse/pause ratio of the discriminators IK . . . LK of 1:1, a dividing signal, which enables the switching of the binary signal generator BG to the operating condition connected with the delivery of the additional signal defining the lower frequency control range ($f_1$ in FIG. 2).

If the predetermined threshold value is exceeded, a conditioning signal is delivered to the binary signal generator BG from the comparator V, and this signal enables the switching of the binary signal generator BG to the operating condition connected with the delivery of the additional signal defining the upper frequency control range ($f_2$ in FIG. 2). The switching itself takes place with the routing of a corresponding trigger signal from the control unit RS monitoring the reference phase formation.

The circuit arrangement operates such that with the aid of the comparator V it is determined at any given time whether the difference between the central office clock phase position and the line clock phase position nearest to the mean lies above or below a predetermined value of, for example, 180°. As soon as for any reason a reference phase formation is triggered in the first synchronizing circuit, the bistable stage BG is placed in an operative condition dependent on the comparator output signal concerned. In this condition it adds to the control voltage for the central office clock oscillator O generated by the first synchronizing cirrcuit a boosting voltage of a value such that the central office clock generator O operates in a frequency control range (determined by the first synchronizing circuit) above or below its no-load frequency. In this range the difference between the central office clock phase position and the line clock phase position is eliminated. The reference phase formation in the first synchronizing circuit may thereby be triggered by crossing the control range of the first synchronizing circuit, as explained hereinabove, and/or by crossing a maximum preset phase difference between the central office clock and the line clock, which may be determined by the control unit SR of the second synchronizing circuit and/or by routine triggering from the outside.

The position of one frequency control range above ($f_1$) and one below ($f_2$) the no-load frequency $f_o$ of the oscillator is indicated qualitatively in FIG. 2. Furthermore, a control range is indicated by dash-dotted lines, to point out the area wherein the principle of the invention is not applied.

In the circuit arrangement shown in FIG. 1, a frequency control range change is carried out concurrently with a reference phase formation, but it is also possible to connect a change of the frequency range with a reference phase formation such that the frequency shift is first carried out and that, for example, a reference phase is not formed until the system has been built up or that, conversely, first the reference phase is formed and the frequency shift is not effected until the system has been built up.

The object of eliminating transit-time dependent phase differences can be achieved quite accurately with the aid of the circuit arrangement described in FIGS. 1 and 2 and by carrying out, to a certain extent, a two-point control. This accuracy can be further enhanced, if, instead of a shifting back and forth between two frequency control ranges, proportional frequency control range changes are provided for the difference between the central office clock and the line clocks. For this, an analog quantity storage would have to be provided, instead of the comparator V and the binary signal generator BG.

In contradistinction to the conditions described in FIG. 1, it is also possible to supply an additional signal to the control signal delivered by the first synchronizing circuit. This signal defines, if there is a positive difference exceeding a predetermined limit value between the central office clock phase position and the phase position of at least one line clock, at least one frequency control range ($f_1$ in FIG. 2) lying below the no-load frequency ($f_o$ in FIG. 2) of the oscillator. If there is a negative difference falling below a preset limit value between the central clock phase position and the phase position of at least one line clock, it defines at least one frequency control range ($f_2$ in FIG. 2) lying above the no-load frequency of the oscillator. The frequency of the central office clock oscillator O is regulated in the frequency control range $f_2$ by the control signal provided by the first synchronizing circuit. In this type of construction, according to the invention, no element producing a cumulative value of a mean value would have to be provided in the second synchronizing circuit, in contradistinction to the conditions illustrated in FIG. 1. Instead, the output signals would each have to be routed to the phase comparators IK . . . LK having their own threshold elements defining the aforementioned limit value which, in turn, drives the additional signal generator (BG in FIG. 1).

In contrast to the conditions illustrated in FIG. 1, it is also possible to perform a digital comparison, instead of an analog comparison, in order to determine the phase difference between the central office clock and the line clock. In this case, a full adder may be provided instead of a bistable switching stage (IK . . . LK in FIG. 1), to which the output word of the central office clock frequency divider formed by a binary counter is directly routed and to which an inverted output word of a line clock frequency divider is coupled. The temporary phase difference between the central office clock and the line clock is then imdicated at the outputs of the full adder for each clock pulse, by itself, through a corresponding binary word. This binary signal may, thereafter, either be converted into an analog quantity or digitized.

The principles of the invention have been described hereinabove by describing a preferred embodiment, constructed accordingly. This description is not limiting, and modifications to or changes in the preferred embodiment may be made, while still being within the scope of the invention, as defined by the appended claims.

I claim:

1. Apparatus for mutually synchronizing central office clock oscillators in each of a plurality of interconnected switching centers constituting a telecommunication network, the apparatus in each switching center comprising:

adjustable clock oscillator means having an output frequency which is adjustable in value in dependence on the value of a synchronizing signal, first and second synchronizing circuits for producing synchronizing circuit output signals responsive to phase comparisons between said adjustable clock oscillator and the clock oscillator outputs of others of said switching centers connected to the defined switching center, each said synchronizing circuit comprising a plurality of line frequency dividers, each of which receives one of said clock oscillator outputs from said other switching centers and produces frequency-divided outputs therefrom, a central office frequency divider for producing a divided-output signal from said adjustable clock oscillator output, a plurality of phase comparators, each of which compares the output from one of said line frequency dividers with the output from said central office divider and produces an output signal of a value corresponding to the phase difference therebetween, adding means for producing an output signal of a value corresponding to the sum of said phase comparator output signals and means for producing the synchronizing circuit output signal from said adding means output signal, said first synchronizing circuit including means for producing an output signal having a control range corresponding to the phase difference between said adjustable clock oscillator and the clock oscillator in at least one of said other switching centers conditioned by the greatest possible no-load frequency difference between said adjustable clock oscillator and the clock oscillator in said at least one other switching center, the generation of a reference phase occurring upon the crossing of said control range by said first synchronizing circuit output signal, said second synchronizing circuit including means for producing an output signal having an operating range corresponding to the phase difference between said adjustable clock signal and the clock signal from said at least one other switching center and the greatest possible propagation time variation in a line connecting two of said switching centers and means for combining said first and second synchronizing circuit output signals for producing said synchronizing signal.

2. The apparatus defined in claim 1 wherein said second synchronizing circuit output signal has an operating range of a first value below the no-load frequency of said adjustable clock if there is a positive phase difference between said adjustable clock signal and a predetermined value and an operating range of a second value above the no-load frequency of said adjustable clock if there is a negative phase difference between said adjustable clock signal and said predetermined value.

3. The apparatus defined in claim 2 wherein said producing means in said second synchronizing circuit includes binary signal producing means having output signal values corresponding, respectively, to said first and second value operating ranges.

4. The apparatus defined in claim 3 further comprising a comparator means interposed between the output of said adding means and said binary signal means for enabling said binary signal means to produce one or the other of its output signal values in dependence on the relationship between the value of the output from said adding means and a nominal value.

5. The apparatus defined in claim 4 wherein said binary signal means is a bistable switching stage and further comprising:

means for monitoring the formation of a reference phase, an inverter coupling an output of said comparator to a first conditioning input of said bistable stage, another output of said comparator being connected directly to a second conditioning input of said bistable stage and, means connecting said monitoring means to a trigger input of said bistable stage.

6. The apparatus defined in claim 1 further comprising means for initiating the formation of reference phases from external signals.

* * * * *